United States Patent
Heeke et al.

(10) Patent No.: US 10,895,317 B2
(45) Date of Patent: Jan. 19, 2021

(54) MAGNETIC FILTER IN A FLUID CHANNEL UPSTEAM OF ELECTRIC MOTOR IN A MODULAR HYBRID TRANSMISSION

(71) Applicant: Schaeffler Technologies AG & Co. KG, Herzogenaurach (DE)

(72) Inventors: Gregory Heeke, Wooster, OH (US); Md. Wasi Uddin, Akron, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 617 days.

(21) Appl. No.: 15/685,990

(22) Filed: Aug. 24, 2017

(65) Prior Publication Data

US 2019/0063586 A1    Feb. 28, 2019

(51) Int. Cl.
*F16H 57/04* (2010.01)
*B60K 6/48* (2007.10)
(Continued)

(52) U.S. Cl.
CPC ......... *F16H 57/0402* (2013.01); *B03C 1/282* (2013.01); *B03C 1/286* (2013.01); *B03C 1/30* (2013.01); *B60K 6/48* (2013.01); *F16H 57/0476* (2013.01); *B03C 2201/18* (2013.01); *B03C 2201/20* (2013.01); *B03C 2201/30* (2013.01); *B60Y 2200/92* (2013.01); *B60Y 2306/05* (2013.01); *Y10S 903/902* (2013.01)

(58) Field of Classification Search
CPC .... F16H 57/0402; F16H 57/0476; B60K 6/48
USPC ............................ 210/222, 223, 695; 74/661
See application file for complete search history.

(56) References Cited

U.S. PATENT DOCUMENTS

| 4,914,968 A | * | 4/1990 | Diermeier | F16N 39/06 184/6.24 |
| 5,089,129 A | * | 2/1992 | Brigman | B01D 35/06 210/223 |

(Continued)

FOREIGN PATENT DOCUMENTS

CN    200273772 Y    2/1998
JP    2005-083491 A    3/2005
(Continued)

OTHER PUBLICATIONS

International Search Report for PCT/US2018/045269, dated Nov. 21, 2018.

*Primary Examiner* — William C Joyce
(74) *Attorney, Agent, or Firm* — Davidson, Davidson & Kappel, LLC

(57) ABSTRACT

A hybrid drive unit configured for arrangement in a torque path upstream from a transmission and downstream from an internal combustion engine is provided. The hybrid drive unit includes an electric motor, a clutch configured for selectively coupling the internal combustion engine to the electric motor for driving the transmission, and a housing supporting the electric motor. The housing includes a fluid inlet channel for directing cooling fluid from the transmission to the electric motor. The hybrid drive unit also includes a filter assembly attached to the housing. The filter assembly is arranged in a fluid flow path of the cooling fluid downstream of the inlet and upstream of the electric motor. The filter assembly is configured for removing ferrous metallic particles from the cooling fluid.

8 Claims, 3 Drawing Sheets

(51) Int. Cl.
*B03C 1/28* (2006.01)
*B03C 1/30* (2006.01)

(56) References Cited

U.S. PATENT DOCUMENTS

| | | | | |
|---|---|---|---|---|
| 5,415,603 | A * | 5/1995 | Tuzuki | B60K 6/26 |
| | | | | 477/5 |
| 6,423,215 | B1 * | 7/2002 | Stein | B01D 29/117 |
| | | | | 210/131 |
| 6,849,179 | B1 * | 2/2005 | Taylor | B01D 35/027 |
| | | | | 184/6.24 |
| 7,299,683 | B2 | 9/2007 | Nikkels et al. | |
| 8,602,940 | B2 * | 12/2013 | Kuwahara | B60K 23/02 |
| | | | | 477/86 |
| 9,429,275 | B2 * | 8/2016 | Long | B60K 6/48 |
| 9,463,470 | B2 | 10/2016 | Murahashi et al. | |
| 2006/0124534 | A1 * | 6/2006 | Cortes Galvez | F16H 57/0408 |
| | | | | 210/443 |
| 2007/0262028 | A1 * | 11/2007 | Flaherty | B03C 1/286 |
| | | | | 210/695 |
| 2009/0107769 | A1 * | 4/2009 | Sato | B60K 6/365 |
| | | | | 184/6.2 |
| 2011/0232786 | A1 * | 9/2011 | Matsushita | B60K 6/445 |
| | | | | 137/565.11 |
| 2014/0014561 | A1 * | 1/2014 | Tzeng | B01D 35/06 |
| | | | | 210/85 |

FOREIGN PATENT DOCUMENTS

| | | |
|---|---|---|
| JP | 2013-142371 A | 7/2013 |
| KR | 10 2015 0034904 A | 4/2015 |

\* cited by examiner

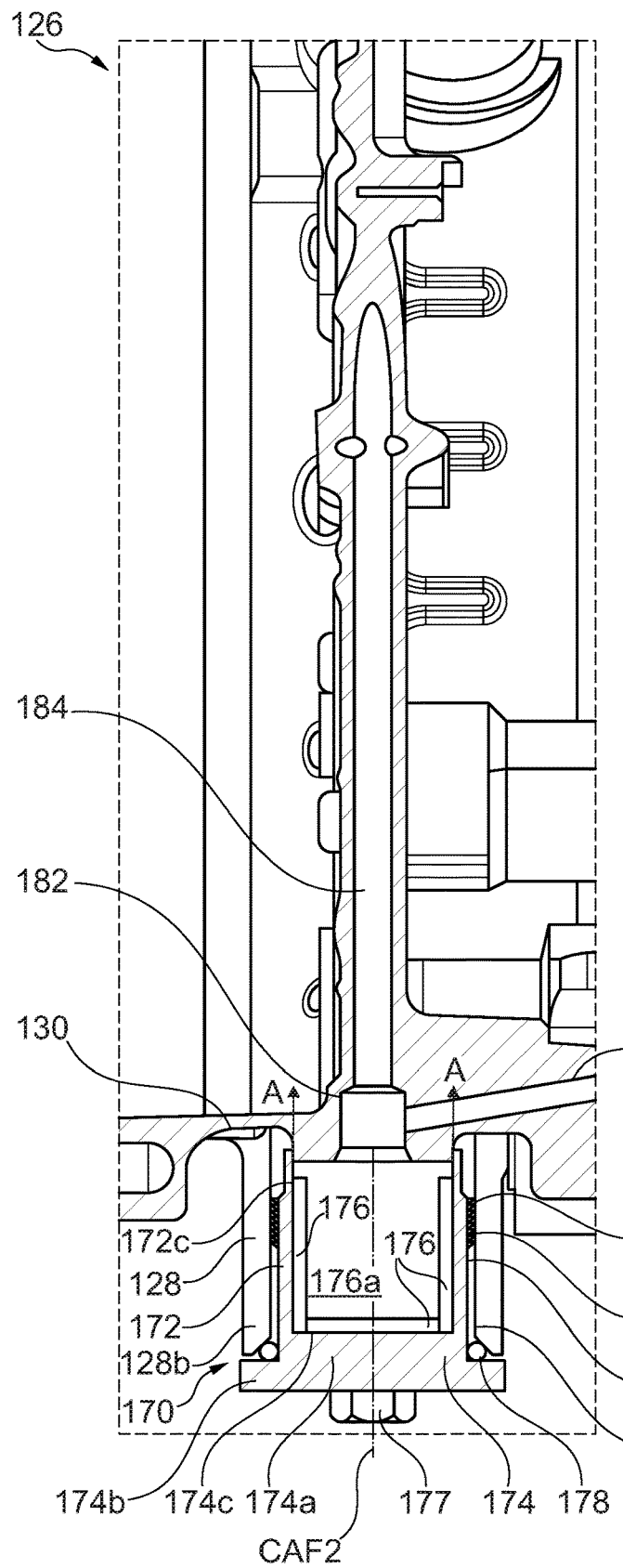
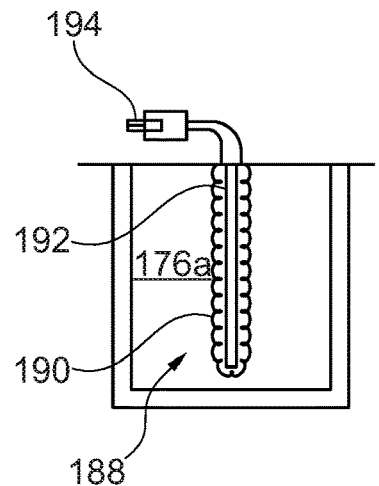
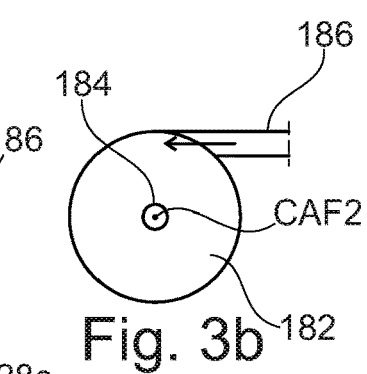
Fig. 3a
Fig. 3b
Fig. 3c

MAGNETIC FILTER IN A FLUID CHANNEL UPSTEAM OF ELECTRIC MOTOR IN A MODULAR HYBRID TRANSMISSION

The present disclosure relates generally to electric motors and more specifically to electric motors in modular hybrid transmissions.

BACKGROUND

Magnets are used in the oil pan of a transmission and aftermarket inline oil filters with magnets installed. U.S. Pat. No. 9,463,470 discloses a magnetic-separation filter device.

SUMMARY OF THE INVENTION

Transmission pan magnets pull particles out of the oil in the oil pan and transmission cooler filters with magnets filter oil returning to the transmission from the oil cooler. Neither magnet is in the direct path to the electric motor, which leaves a strong possibility these ferrous metallic particles will find their way to the strong magnets in the embedded electric motor where they will decrease an efficiency of the electric motor.

A hybrid drive unit configured for arrangement in a torque path upstream from a transmission and downstream from an internal combustion engine is provided. The hybrid drive unit includes an electric motor, a clutch configured for selectively coupling the internal combustion engine to the electric motor for driving the transmission, and a housing supporting the electric motor. The housing includes a fluid inlet channel for directing cooling fluid from the transmission to the electric motor. The hybrid drive unit also includes a filter assembly attached to the housing. The filter assembly is arranged in a fluid flow path of the cooling fluid downstream of the inlet and upstream of the electric motor. The filter assembly is configured for removing ferrous metallic particles from the cooling fluid.

Embodiments of the hybrid drive unit may include one or more of the following features:

the filter assembly includes at least one magnet for attracting the ferrous metallic particles flowing through the filter assembly;

the at least one magnet extends into a bore provided in the housing longitudinally such that the cooling fluid flowing from the inlet channel through the filter assembly flows along a length of the at least one magnet;

the filter assembly includes at least one wall, the at least one magnet being provided on the at least one wall to form a chamber within the filter assembly, the filter assembly being configured such that the ferrous metallic particles are drawn into the chamber by the at least one magnet during operation of the hybrid drive unit;

the filter assembly is configured for removable attachment to the housing such that the ferrous metallic particles accumulating in the filter assembly during operation of the hybrid drive unit are removable during servicing of the filter assembly;

the housing includes a bore intersecting an outer circumference thereof receiving the filter assembly;

the housing includes a housing attachment section in the bore, the filter assembly including a filter attachment section configured for removably engaging the housing attachment section to removably attach the filter assembly to the housing; or a sensor configured for provide signals indicating an amount of the ferrous metallic particles present in the filter assembly.

A hybrid module is also provided. The hybrid module includes the hybrid drive unit configured for attachment to the internal combustion engine and a torque converter configured for attachment to a transmission input shaft of the transmission.

A method of constructing a hybrid drive unit configured for arrangement in a torque path upstream from a transmission and downstream from an internal combustion engine is provided. The method includes providing an electric motor, a clutch configured for selectively coupling the internal combustion engine to the electric motor for driving the transmission, and a housing supporting the electric motor, the housing including a fluid inlet channel for directing cooling fluid from the transmission to the electric motor; and attaching a filter assembly to the housing in a fluid flow path of the cooling fluid downstream of the inlet and upstream of the electric motor such that the filter assembly is configured for removing ferrous metallic particles from the cooling fluid.

Embodiments of the method may include one or more of the following features:

the filter assembly includes at least one magnet and the filter assembly is attached to the housing such that the ferrous metallic particles flowing through the filter assembly are attracted to the at least one magnet;

the filter assembly is attached to the housing such that the at least one magnet extends into a bore provided in the housing longitudinally in an alignment for the cooling fluid flowing from the inlet channel through the filter assembly to flow along a length of the at least one magnet;

the filter assembly includes at least one wall, the at least one magnet being provided on the at least one wall to form a chamber within the filter assembly, the filter assembly being attached to the filter assembly such that the ferrous metallic particles are drawn into the chamber by the at least one magnet during operation of the hybrid drive unit;

the filter assembly is removably attached to the housing such that the ferrous metallic particles accumulating in the filter assembly during operation of the hybrid drive unit are removable during servicing of the filter assembly;

the housing includes a bore intersecting an outer circumference and the filter assembly is attached in the bore;

the housing includes a housing attachment section in the bore and the filter assembly includes a filter attachment section, the attaching the filter assembly to the housing including removably engaging the filter attachment section to the housing attachment section to removably attach the filter assembly to the housing;

providing the filter assembly with a sensor configured for provide signals indicating an amount of the ferrous metallic particles present in the filter assembly.

BRIEF DESCRIPTION OF THE DRAWINGS

The present invention is described below by reference to the following drawings, in which:

FIGS. 3a to 3c show a filter assembly attached a housing of a hybrid drive unit of the hybrid module in accordance with another embodiment of the invention.

DETAILED DESCRIPTION

The present disclosure provides a removable magnet filter assembly for installation in a cooling oil inflow channel of a hybrid drive unit including an electric motor. The hybrid drive unit is part of a hybrid module cooled by transmission oil. The removable magnet is installed to prevent iron particles present in the transmission oil from contaminating permanent magnets in hybrid motors by filtering out the particles before the oil reaches the motor.

The removable magnetic filter assembly is integrated into the cooling oil flow prior to flowing over an embedded permanent magnet electric motor. The arrangement of the filter assembly reduces the ferrous particles that would otherwise flow over the rotor and become stuck to the magnets. The filter assembly can be in the form of a removable plug on a bottom of a housing of the hybrid drive unit, allowing the filter assembly to be cleaned and serviced. The cooling oil enters the inflow channel of the housing from the transmission, then enters a chamber with a larger volume than the inflow channel, thus reducing fluid velocity giving the filter assembly a greater opportunity to attract the ferrous particles. After passing through the filter assembly, the oil continues its path to cool the electric motor.

Figure 1:
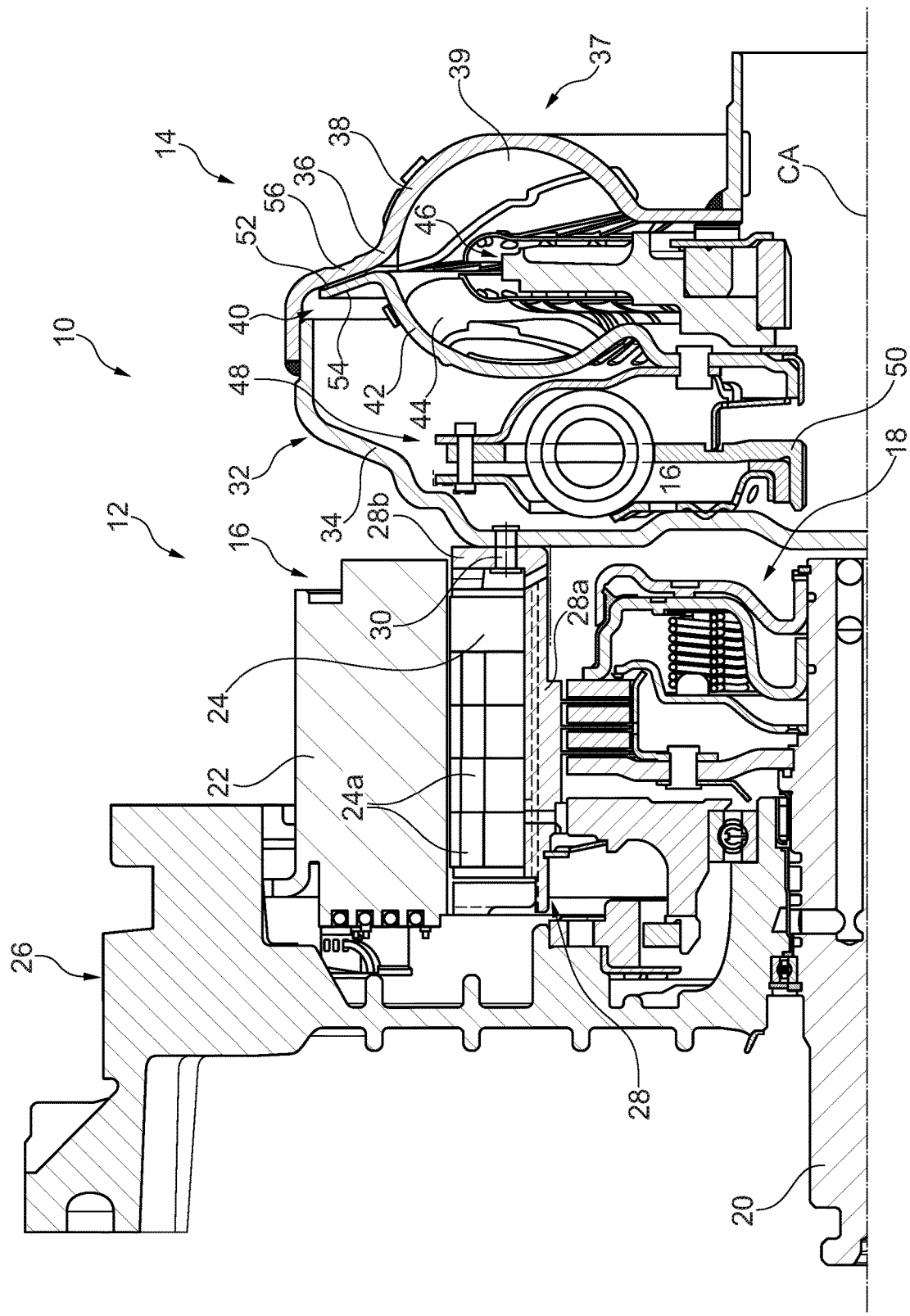
FIG. 1 shows a hybrid module in accordance with an embodiment of the present invention.

FIG. 1 shows hybrid module 10 in accordance with an embodiment of the present invention. Module 10 includes a hybrid drive unit 12 configured for attachment to an internal combustion engine and a torque converter 14 configured for attachment to a transmission input shaft. In a known manner, hybrid drive unit 12 is selectively operable to transmit torque from the internal combustion engine to torque converter 14 or directly drive torque converter 14 via an electric motor 16 of drive unit 12. Along these lines, hybrid drive unit 12 includes an engine connect/disconnect clutch 18 for selectively connecting torque converter 14 to an input shaft 20, which is configured for drivingly connecting for example via a flywheel to a crankshaft of the internal combustion engine, or disconnecting torque converter 14 from input shaft 20 such that torque converter can be driven solely by electric motor 16.

Electric motor 16 includes a stator 22 and a rotor 24, with stator 22 being fixed to a housing 26 of hybrid drive unit 12. Upon current being provided to coils of stator 22, rotor 24 is rotated about a center axis CA of hybrid module 10 in a known manner, due to rotor 24 including a plurality of permanent magnet segments 24a that are energized by the current in the coils. The terms axially, radially and circumferentially as used herein are used with respect to center axis CA. Magnet segments 24a are supported at their inner circumferences by a rotor carrier 28. Rotor carrier 28 includes a cylindrical axially extending section 28a supporting the inner circumferences of magnet segments 24a and a radially extending section 28b protruding radially outward from an end of axially extending section 28a. Torque converter 14 is fixed to hybrid drive unit 12 at radially extending section 28b of rotor carrier 28 by a plurality of fasteners 30 passing through a cover 32 of torque converter 14.

Torque converter 14 includes a front cover 34 and a rear cover 36 together forming cover 32, with fasteners 30 passing through front cover 34. Rear cover 36 includes forms an impeller shell 38 of an impeller 37 that includes a plurality of impeller blades 39. Torque converter 14 also includes a turbine 40 configured to define a piston that is axially moveable toward and away from impeller shell 38 such that an engagement section of turbine 40 engages an engagement section of impeller shell 38 so as to form a lockup clutch. Turbine 40 includes a turbine shell 42 supporting a plurality of turbine blades 44. Torque converter 14 also includes a stator 46 axially between turbine 40 and impeller 37 to redirect fluid flowing from the turbine blades 44 before the fluid reaches impeller blades 39 to increase the efficiency of torque converter 14. Torque converter 14 further includes a damper assembly 48 fixed to turbine shell 42. Damper assembly 48 is configured for receiving torque from turbine shell 42 and transferring torque to the transmission input shaft. For transferring torque to the transmission input shaft, damper assembly 48 includes a support hub 50, which includes a splined inner circumferential surface for non-rotatably connecting to an outer circumferential surface of the transmission input shaft.

A friction material 52 is bonded onto a radially extending impeller facing surface of an outer radial extension 54 of turbine shell 42, which is radially outside of blades 44 and forms the engagement section of turbine 40, for engaging a radially extending wall 56 of impeller shell 38, which is radially outside of blades 39 and forms the engagement section of impeller shell 38. In other embodiments, instead of or in addition to being bonded to outer radial extension 54, friction material 52 may be bonded to radially extending turbine facing surface of radially extending wall 56, or to one or more additional discs between radially extension 54 and wall 56. Regardless of whether friction material 52 is bonded to outer radial extension 54, radially extending wall 56 or one or more additional discs, friction material 52 is provided axially between extension 54 and wall 56 to selectively rotationally engage the engagement section of turbine piston 40 with the engagement section of impeller shell 38. Torque converter 14 receives torque input from hybrid drive unit 12 through fasteners 30 at front cover 34, which is transmitted to impeller 37. Impeller 37 drives turbine 40 via fluid flow from impeller blades 39 to turbine blades 44, when the lockup clutch is disengaged, or via friction material 52, when the lockup clutch is engaged. Turbine 40 then drives damper assembly 48, which in turn drives the transmission input shaft.

Figure 2:
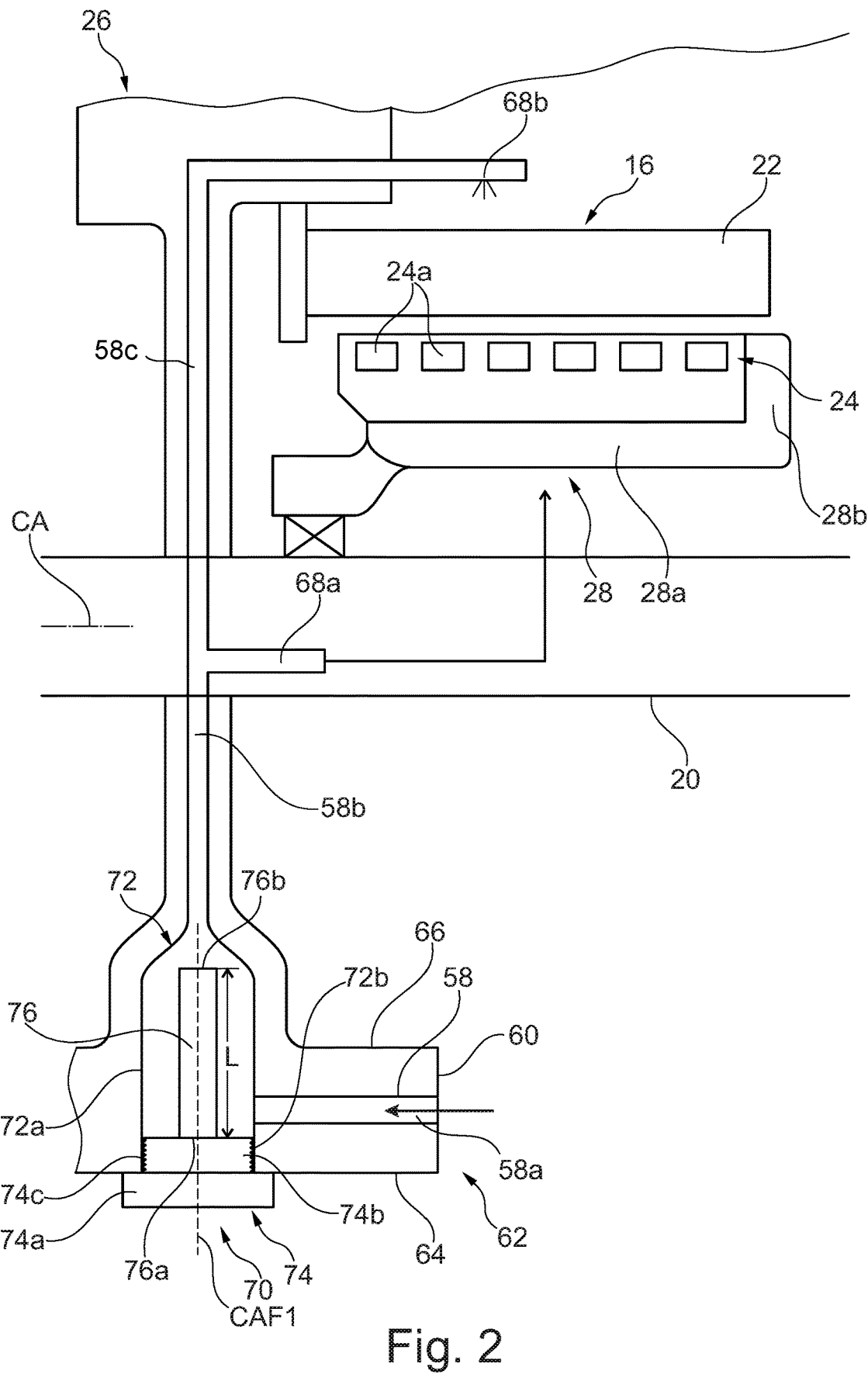
FIG. 2 shows a filter assembly attached a housing of a hybrid drive unit of the hybrid module in accordance with an embodiment of the invention.

As illustrated schematically in FIG. 2, in one embodiment of the present invention, in order to cool electric motor 16 of drive unit 12 during operation, cooling oil is provided from the transmission through housing 26 of hybrid drive unit 12 to electric motor 16. FIG. 2 shows only housing 26 and only half of motor 16 for ease of explanation. Housing 26 includes an axially extending inlet channel 58 for receiving cooling oil from the transmission. Channel 58 is radially outside of electric motor 16 and begins at a transmission facing radially extending wall 60 of an outer rim 62 of housing 26. Radially extending wall 60 extends radially inward from an outer circumferential surface 64 of rim 62, which forms an outermost circumferential surface of housing 26, to an inner circumferential surface 66 of rim 62. Cooling oil entering channel 58 flows axially into at an axially extending channel section 58a in rim 62, then radially inward along a radially extending channel section 58b to center shaft 20 at a radially inner outlet port 68a, then radially outward along a radially extending channel section 58c to flow over rotor 24 to cool rotor 24. Cooling oil from channel 58 also flows to a radially outer outlet port 68b a arranged radially outside of stator 22 and configured for directing the cooling oil radially inward onto stator 22. In the embodiment shown in FIG. 2, port 68b is formed as a spray nozzle that sprays the cooling oil onto an outer circumferential surface of stator 22 to cool stator 22.

A magnetic filter assembly 70 is provided in housing 26 for filtering out ferrous metallic particles from the cooling oil before the cooling coil flows to electric motor 16 to cool stator 22 and rotor 24. Filter assembly 70 removes the ferrous metallic particles to prevent the ferrous metallic particles from flowing to the strong magnets of rotor 24 and thus decreasing the efficiency of electric motor 16. In the embodiment shown in FIG. 2, housing 26 is provided with a bore 72 that intersects with channel 58, with filter assembly 70 being provided inside bore 72. More specifically, filter assembly 70 is formed as a removable plug that includes a base 74 for connecting with housing 26 and a magnet 76 protruding away from base 74, such that magnet 76 extends away from base 74 radially inward toward center axis CA when filter assembly 70 is installed in housing 26. Base 74 includes a head 74a for contacting outer circumferential surface 64 and a connector 74b for connecting filter assembly 70 to housing 26 and aligning magnet 76 in bore 72. In the embodiment shown in FIG. 2, bore 72 includes a cylindrical wall 72a intersecting outer circumferential surface 64 to form a circular hole at outer circumferential surface 64. Bore 72 includes a cylindrical threaded section 72b formed in wall 72a, with section 72b extending radially inward from the circular hole. The threads of cylindrical threaded section 72b engage threads on an outer circumferential surface 74c on connector 74b to removably secure filter assembly 70 to housing 26, such that connector 74b and magnet 76 are held in bore 72.

Magnet 76 has an elongate shape such that a length L of magnet 76, which is defined by the extension of magnet 76 from a first end 76a connected to connector 74b of base 74 to a second free end 76b that is surrounded by fluid, is oriented such that magnet 76 extends greater radially with respect to center axis CA than axially. In other words, magnet 76 extends greater axially with respect to a center axis CAF1 of filter assembly 70, which magnet 76 is longitudinally centered on, than radially with respect to center axis CAF1. Channel 58 intersects cylindrical wall 72a of bore 72, either radially or tangentially with a respect to a center axis CAB of bore 72, to provide fluid to bore 72. Channel 58 intersects cylindrical wall 72a closer to first end 76a than second end 76b such fluid entering bore 72 from channel 58 flows radially inward with respect to center axis CA along a majority of the length L of magnet 76. As the fluid flows along the length L of magnet 76, ferrous metallic particles in the fluid attach to magnet 76 such that are prevented from flowing to electric motor 16.

FIG. 3a shows partial cross-sectional view of a housing 126 and a filter assembly 170 in accordance with another embodiment of the present invention. In the embodiment shown in FIG. 3a, filter assembly 170 includes a plurality of magnets 176 and is provided at an outer circumferential surface of housing 126. More specifically, housing 126 includes at least one support wall 128 cast into housing 126 at an outer circumferential surface 130 of housing 126. In an alternative embodiment, wall 128 may be fixed to housing 126, for example by welding. In the embodiment of FIG. 3a, wall 128 is a single cylindrical wall, but in other embodiments wall 128 can include a plurality of walls forming another shape, for example a box shape. Filter assembly 170 is removably fixed to housing 126 such that filter assembly 170 can be removed for servicing. More specifically, filter assembly 170 includes at least one alignment wall 172 for being receiving in a space defined by wall 170. The at least one base wall 172 has a shape that matches the shape of at least one wall 128 for aligning the at least one alignment wall 172 with the at least one base wall 172. Accordingly, in the embodiment of FIG. 3a, wall 172 is formed by a single wall having a cylindrical shape, but in other embodiment wall 172 can include a plurality of walls, for example four when at least one wall 128 is formed by four walls forming a box shape.

Filter assembly 170 further includes a base 174, with wall 172 being fixed to base 174 and extending radially inward from base 174 toward center axis CA (FIG. 1). Wall 172 is configured for removably coupling filter assembly 170 via helical threads 172a provided on outer surfaces 172b of wall 172 by being configured for intermeshing with helical threads 128c provided on inner surfaces 128a of wall 128. Filter assembly 170 is configured for manipulation by an installation tool, for each a drill or wrench including a socket, to removably install filter assembly 170 on housing 126, by a tool interlocking section, which is formed as a bolt head 177 in this embodiment. Base 174 includes a central portion 174a supporting bolt head 177 and extending to outer surfaces 172b of wall 172, and a flanged portion 174b extending radially outward from a center axis CAF2 of filter assembly 170. A seal 178 is sandwiched between flanged portion 174b and an outer rim 128b of wall 128, i.e., axially, with respect to center axis CAF2, between flanged portion 174b and rim 128b, such that when threads 128c, 172a intermesh and filter assembly 170 is provided in wall 128 after tightening via the installation tool transmission fluid does not leak from between walls 128, 172 past outer rim 128b.

Wall 172 and base 174 include magnets 176 provided on respective inner surfaces 172c, 174c thereof, such that magnets 176 define a ferrous metallic particle receiving space 176a, which in this embodiment is cylindrically shaped, within filter assembly 170 for receiving and storing ferrous metallic particles that attract to magnets 176. When filter assembly 170 is fixed to housing 126, space 176a is aligned concentrically with an input port 182 provided in housing 126 at outer circumferential surface 130. Input port 182 is arranged to fluidly connect filter assembly 170 with a radially extending channel 184 that is configured for providing fluid to electric motor 16 (FIG. 1) in the same manner as the embodiment in FIG. 2. An inlet channel 186 is provided in housing 126 to supply cooling fluid from the transmission for cooling motor 16 into housing 126. Inlet channel 186 extends axially with respect to center axis CA (FIG. 1) and is tapered radially outward to intersect inlet port 182. As shown in FIG. 3b, which is taken along A-A in FIG. 3a, port 182 has a circular cross-section and inlet channel 186 intersects port 182 at an outer circumference thereof such that port 182 is aligned tangentially with respect to port 182 such fluid and any ferrous metallic particles therein flowing from inlet follow a cycloidal path when entering into space 176a, increasing the path and time in space 176a to ensure the ferrous metallic particles attach to magnets 176. The arrangement of channel 186 with respect to port 182 allows the ferrous metallic particles in the fluid to be suspended near filter assembly 170 to a sufficient degree such that the magnetic forces of magnets 176 pull the ferrous metallic particles thereto. Magnets 176 are of sufficient strength such that space 176a fills up with ferrous metallic particles to a predetermined level during the operation of hybrid module 10 without impacting the ability of magnets 176 to attract ferrous metallic particles in fluid entering channel 186 to filter assembly 170. Once space 176a fills up with particles to the predetermined level, filter assembly 170 can be removed from housing 126, emptied of ferrous metallic particles, then reattached to housing 126.

Filter assembly 170 may be provided with a sensor for measuring the amount of ferrous metallic particles in space 176a. FIG. 3c shows such a sensor 188 for measuring the amount of ferrous metallic particles in space 176a in accordance with an embodiment of the present invention. Sensor 188 may be connected to base 174, positioned along center axis CAF2 and extending into space 176a, but may also be connected directly to housing 126 and extending into space 176a from another direction. Sensor 188 includes a non-magnetic resistance wire 190, for example made of nickel-chrome that is supported in space 176a by a post 192. As ferrous metallic particles build up in space 176a, the resistance of wire 190 changes proportionally to the amount of ferrous metallic particles in space 176a. Sensor 188 includes an output terminal 194 that is electrically connectable to a controller for outputting a representation, which may be for example visual or audible, indicating that filter assembly 170 is filled with ferrous metallic particles to the predetermined level, or to a percentage of the predetermined level, and thus needs to be replaced.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid module
12 hybrid drive unit
14 torque converter
16 electric motor
18 engine connect/disconnect clutch
20 input shaft
22 stator
24 rotor
24a magnet segments
26 housing
28 rotor carrier
30 fasteners
32 cover
34 front cover
36 rear cover
37 impeller
38 impeller shell
39 impeller blades
40 turbine
42 turbine shell
44 turbine blades
46 stator
48 damper assembly
50 support hub
52 friction material
54 outer radial extension
56 radially extending wall
58 channel
58a axially extending channel section
58b radially extending channel section
58c radially extending channel section
60 radially extending wall
62 rim
64 outer circumferential surface
66 inner circumferential surface
68a radially inner outlet port
68b radially outer outlet port
70 magnetic filter assembly
72 bore
72a cylindrical wall
72b cylindrical threaded section
74 base
74a head
74b connector
76 magnet
76a first end
76b second free end
126 housing
128 support wall
128a inner surfaces
128b outer rim
128c helical threads
130 outer circumferential surface
170 filter assembly
172 alignment wall
172a wall helical threads
172b wall outer surfaces
172c wall inner surfaces
174 base
174a central portion
174b flanged portion
174c base inner surface
176 magnets
176a ferrous metallic particle receiving space
177 bolt head
178 seal
182 input port
184 radially extending channel
186 inlet channel
188 sensor
190 non-magnetic resistance wire
192 post
194 output terminal

What is claimed is:

1. A hybrid module comprising:
a hybrid drive unit configured for arrangement in a torque path upstream from a transmission and downstream from an internal combustion engine, the hybrid drive unit comprising:
an electric motor;
a clutch configured for selectively coupling the internal combustion engine to the electric motor for driving the transmission;
a housing supporting the electric motor, the housing including an axially extending fluid inlet channel radially outside of the electric motor, a radially extending fluid channel and a further axially extending fluid channel, the axially extending fluid inlet channel configured for directing cooling fluid from the transmission to the radially extending fluid channel, the radially extending fluid channel configured for directing the cooling fluid from the axially extending fluid inlet channel to the further axially extending fluid channel, the further axially extending fluid channel configured for directing the cooling fluid from the radially extending fluid channel to the electric motor; and
a filter assembly attached to the housing, the filter assembly being arranged in a fluid flow path of the cooling fluid downstream of the inlet and upstream of the electric motor, the filter assembly being configured for removing ferrous metallic particles from the cooling fluid, the filter assembly including at least one magnet for attracting the ferrous metallic particles flowing through the filter assembly, the at least one magnet being upstream from the radially extending fluid channel, the hybrid drive unit being configured for attachment to the internal combustion engine; and a torque converter attached to the hybrid drive unit and configured for attachment to a transmission input shaft of the transmission.

2. The hybrid module as recited in claim 1 wherein the at least one magnet extends into a bore provided in the housing longitudinally such that the cooling fluid flowing from the axially extending fluid inlet channel through the filter assembly flows along a length of the at least one magnet.

3. The hybrid module as recited in claim 1 wherein the filter assembly includes at least one wall, the at least one magnet being provided on the at least one wall to form a chamber within the filter assembly, the filter assembly being configured such that the ferrous metallic particles are drawn into the chamber by the at least one magnet during operation of the hybrid drive unit.

4. The hybrid module as recited in claim 1 wherein the filter assembly is configured for removable attachment to the housing such that the ferrous metallic particles accumulating in the filter assembly during operation of the hybrid drive unit are removable during servicing of the filter assembly.

5. The hybrid module as recited in claim 4 wherein the housing includes a bore intersecting an outer circumference thereof receiving the filter assembly.

6. The hybrid module as recited in claim 5 wherein the housing includes a housing attachment section in the bore, the filter assembly including a filter attachment section configured for removably engaging the housing attachment section to removably attach the filter assembly to the housing.

7. The hybrid module as recited in claim 1 further comprising a sensor configured for provide signals indicating an amount of the ferrous metallic particles present in the filter assembly.

8. The hybrid module as recited in claim 1 wherein the at least one magnet is at a transition between the axially extending fluid inlet channel and the radially extending fluid channel.

* * * * *